Patented Oct. 12, 1954

2,691,621

UNITED STATES PATENT OFFICE 2,691,621

IMPROVED ASPHALT COMPOSITIONS AND METHOD OF PRODUCING SAME

Duane W. Gagle, Bartlesville, Okla., assignor to Phillips Petroleum Company, a corporation of Delaware No Drawing. Application December 17, 1951, Serial No. 262,183

7 Claims. (Cl. 196—22)

Broadly, this invention relates to asphalts. In one embodiment the invention relates to the production of improved asphalts, and in another to the improved asphalt compositions resulting therefrom.

In the production of asphalts the problem of adapting the asphalts for their intended uses by blending procedures and the like is of major importance. Asphalt compositions vary widely in their physical properties even when procured from the same source. For example scarcely any two deposits of native asphalts are alike in their properties or chemical compositions. Hence when making additions to improve the properties of an asphalt it is not always possible to predict with accuracy what the characteristics of the final asphaltic product will be.

This invention, in one of its aspects, pertains to asphalts improved by the incorporation therein of a novel additive. The invention also relates to modified asphalts which are used in road surfacing, foot pavements, floors and roofs. It is my discovery that improved properties are conferred on asphalts by the addition thereto of a resin obtained by distilling a cracked residuum to a pitch having a softening point in excess of 170 (ring and ball), said pitch comprising a major amount of said petroleum resin, and physically separating the resin from said pitch.

By asphalt I mean a species of bitumen and pyrogenous substances of dark color, variable hardness, comparatively non-volatile; composed principally of hydrocarbons substantially free from oxygenated bodies; containing relatively little or no crystallizable paraffins; and including mineral matter, the non-mineral constituents being fusible, and largely soluble in carbon disulfide, yielding water-insoluble sulfonation products. This definition applies to native asphalts and pyrogenous asphalts. Native asphalts include asphalts occurring naturally in a pure or fairly pure state and also asphalts associated naturally with a substantial proportion of mineral matter, for example sand, sandstone, limestone, clay, shale, etc. Pyrogenous asphalts include residues obtained from the distillation, blowing, etc. of petroleum, for example: residual oils, such as are produced by steam distillation of asphaltic petroleum, dry or steam distillation of semi-asphaltic petroleum or dry distillation of non-asphaltic petroleum; blown asphalts, such as are produced by blowing air through heated residual oils; residual asphalts, such as are produced by steam distillation of semi-asphaltic and asphaltic petroleums; sludge asphalts, such as are produced from the acid sludge obtained in the purification of petroleum distillates with sulfuric acid; cut back asphalts, etc.

My invention is of particular importance because I can remake a low grade asphalt to obtain an improved asphalt composition which can be used as are high grade asphalts. This is a result of my discovery that the resin, derived from a pitch having a softening point in excess of 170 obtained by the distillation of a cracked petroleum residue, has a synergistic effect upon the penetration value and, in some instances, on the ductility of asphalts. Hence an asphalt can be modified by the addition of the resin, ordinarily in an amount of from, say five to fifty-five per cent of resin by weight on the asphalt. This invention has the further advantage that a minor amount of resin, say from 1 to 5 per cent by weight enhances the anti-stripping characteristic of such asphalts, thus making them adhere better to aggregate material. Because of this effect upon the asphalt, the resin disclosed herein is of particular importance as an additive for improving asphalts. Thus, my invention provides an asphalt having incorporated therein at least a sufficient amount of said resin to enhance the anti-stripping characteristic of said asphalt. In addition when, as indicated, a larger amount of the resin is used the ductility and penetration values of the asphalt will also be improved. Hence by the addition of a resin which functions either as an asphalt additive or an asphalt modifier, improved asphalts result which are suitable in binders, for example, in paving materials for streets or foot pavements, in coatings for floors, in roofings, as joint fillers, where asphalts are employed.

The preparation of asphalt pavements is well known and varies with the particular surface desired. Although it need not be discussed at length herein it is emphasized that the asphalts disclosed herein can be effectively blended with cut back products, that is the asphalts can be softened by the addition of a softer substance or flux, for example animal and vegetable oils, fuel oils, other residual oils and the like. Besides being valuable in remaking a poor grade petroleum asphalt by conferring thereon improved properties and characteristics so that the low grade asphalt can be used as are high grade asphalts, the disclosed resin cooperates with the cut back materials. Moreover in the preparation of desired asphalts in accordance with my invention, when the resin is used as an additive, it can be used either alone or in combination with additives normally added to asphalts e. g. oleic acid, naphthenic acids, metallic nitrates and other conventionally added salts which are used in amounts of from 0.1 to 2 per cent. When used in addition to such conventional additives an amount of from 0.25 per cent to 1 per cent is sufficient.

As indicated the material employed as a modifier or additive in the practice of this invention is derived from a pitch having a softening point in excess of 170, obtained by the distillation of a cracked petroleum residue, i. e. residua left as bottoms during cracking operations. The pitch is obtained by known means, the residue being heated in one or more stills, for example at a temperature of from 450° F. to 750° F. under vacuum until a pitch having the desired softening point of over 170 is obtained. The pitch obtained from the cracked residue and having a softening point exceeding 170 can comprise over 65 per cent by weight on the pitch of the resin employed in accordance with my invention, and the resin can be isolated or separated from the pitch by physical means. I prefer to obtain the resin from the pitch by vacuum flashing said pitch. A desirable method of obtaining the resin is to vacuum flash the pitch at 760° F. and 100 microns of mercury pressure. However, the resin can be separated from the pitch by solvent extraction, using, for example, propane, pentane, petroleum naphtha and the like.

The following examples and tables are illustrative of my invention. Obviously many modifications or variations in the invention as described will occur to those skilled in the art, particularly with respect to the wide variety of asphalts to which the additive disclosed can be added in accordance with my invention. Such variations can, of course, be made without departing from the spirit of my invention.

EXAMPLE 1

A residue of a cracked West Texas crude was distilled at a temperature of 695° F. at 100 microns' absolute pressure leaving as a residue a pitch which had the properties given in column A of Table 1 which follows. When a pitch thus obtained was vacuum flashed at 760° F. and 98 microns of mercury a resinous product was obtained as overhead which had the properties given in column B of Table 1.

Table 1

| | (A) Pitch | (B) Additive |
|---|---|---|
| Specific Gravity, 60/60 | 1.120 | 1.072 |
| Gravity, API 60/60 | −5.1 | 0.5 |
| Softening Point, Ring and Ball, °F | 184 | 118 |
| Pour Point, °F | | 125 |
| Carbon, wt., percent | 91.4 | 90.6 |
| Hydrogen, wt., percent | 8.1 | 8.9 |
| Carbon: Hydrogen, wt., ratio | 11.3 | 10.2 |
| Carbon Residue, Ramsbottom, wt., percent | 42.8 | 26.1 |
| Ash, wt., percent | 0.060 | 0.008 |
| Penetration at 77 °F., 100 g, 5 sec | 0 | 50 |
| Ductility, 5 cm./min. at 7.7 °F., cm | 0 | 110+ |
| Solubilities [1] in: | | |
| n-Pentane (Malthenes), wt., percent | 68.5 | 97.0 |
| Carbon Tetrachloride, wt., percent | 91.60 | 99.987 |
| Carbon Disulfide, wt., percent | 99.88 | 99.997 |
| Asphaltenes (n-C5 insoluble), wt., percent | 31.5 | 3.0 |
| Carbenes (CS2 soluble, CCl4 insoluble), wt., percent | 8.28 | 0.010 |
| Free Carbon (CS2 insoluble), wt., percent | 0.12 | 0.003 |
| Fixed Carbon (residue after 7 min. at 1750 °F.), wt., percent | 34.5 | 27.2 |
| Bureau of Mines Correlation Index | | 110.9 |

[1] Solubilities were determined by extraction with the solvent until the solute became clear or until the insoluble portion reached a nearly constant weight. The carbon disulfide extractions were conducted using Gooch crucibles with asbestos mats, whereas the carbon tetrachloride and normal pentane extractions were conducted using alundum thimbles.

The capacity of an asphalt (or other bituminous material) for elongating or stretching, i. e. ductility, is determined by making a briquette of the material in a ductility mold. The ductility of the bituminous material is measured by the distance to which the briquette will elongate before breaking. The briquette is pulled apart while immersed in water, the test being made at a temperature of 25° C.±0.5° C. and with a speed of 5 cm. per minute (±5 per cent). Three tests are taken and the average reported. The distance through which the clips, attached to the bituminous material, have been pulled to produce a rupture is measured in centimeters. This test is described more fully in the 5th edition of "Asphalts and Allied Substances," by Herbert Abraham, at pages 1006–1016 (volume 2).

The hardness or plasticity, i. e. penetration value, is considered either alone or in conjunction with the fusing-point, and is determined by the use of a penetrometer. Penetration is defined as the consistency of a bituminous material expressed as the distance that a standard needle vertically penetrates a sample of the material under known conditions of loading, time and temperature, usually 100 gms., 5 seconds and 25° C. respectively, the units of penetration to indicate hundredths of a centimeter. A modification employed in the tests herein consists in maintaining the time (5 seconds) and depth of penetration (0.04, 0.15, or 0.30 cm.) constant and varying the weight required to force the standard needle into the sample to a specified depth in the specified time. A range of weights from 0.1 gm. to 600 gms. is used for this purpose. The penetration test is described in the 5th edition of "Asphalts and Allied Substances," by Herbert Abraham, at pages 984–1000 (volume 2).

EXAMPLE 2

The resinous additive prepared in accordance with Example 1 had a penetration value of 50. This resinous material was blended with a petroleum asphalt comprising 5.8 per cent crude bottoms obtained by the vacuum reduction of a West Texas crude at 780° F. and 70 microns of mercury. The properties of this asphalt are given in Table 2 below.

Table 2

| | |
|---|---|
| Per cent of crude | 5.8 |
| Specific gravity | .9679 |
| Penetration at 77° F | 145 |
| Flash, COC | |
| Ductility, cm., 77° F | 62 |
| Loss on heating, per cent | .02 |
| Penetration after L. O. H. per cent of original | 95.8 |
| Ring and ball softening pt., °F | 110 |
| Solubility, CCl4, per cent | 99.969 |
| Solubility, CS2, per cent | 99.972 |
| Solubility, n-C5, per cent | 96.14 |
| Carbon residue, per cent | 16.3 |
| Oliensis | Negative |

When a blend of 90 per cent of the asphalt by weight and 10 per cent by weight of the modifier of Example 1 was made the resulting penetration value was 161 as compared to 145 for the petroleum asphalt and 50 for the resinous material. A penetration value of over 145 would not be expected. In addition the blend of 90 per cent of the petroleum asphalt, i. e. 5.8 per cent crude bottoms, and 10 per cent of my additive gave a ductility increase from 62 cm. for the asphalt to 82 cm. for the blend. An additional 20 weight per cent of the resinous material, i. e.

a total of 30 per cent resin, increased the ductility to 105 cm.

EXAMPLE 3

Another resin was obtained as described in Example 1 above which had properties similar to the resinous additive of Example 2, but had a penetration value of 81 instead of 50. This resin was blended with an asphalt, bottoms product obtained by the vacuum reduction of a West Texas crude at 780° F. and 70 microns of mercury, represented as 4.56 per cent bottoms. In the following table the properties of this asphalt are given.

Table 3a

| | |
|---|---|
| Per cent of crude | 4.56 |
| Specific gravity | 0.9958 |
| Penetration at 77° F | 33 |
| Flash, COC | 700+ |
| Ductility, cm., 77° F | 3.7 |
| Loss on heating, per cent | .18 |
| Penetration after L. O. H., per cent of original | 78.8 |
| Ring and ball softening pt., °F | 149.5 |
| Solubility, CCl$_4$, per cent | 98.8 |
| Solubility, CS$_2$, per cent | 99.3 |
| Solubility, n-C$_5$, per cent | |
| Carbon residue, per cent | |
| Oliensis | Sl. pos. |

When the additive of my invention was blended with the 4.56 bottoms petroleum asphalt, quite unexpectedly a synergistic value in the penetration of the blended asphalt resulted as well as an increase in dutility, as clearly shown in Table 3b.

Table 3b

| Percent Resinous Material | Percent 4.5 Bottoms | Ductility | Penetration |
|---|---|---|---|
| 0 | 100 | 3.7 | 33 |
| 10 | 90 | 6.5 | 40 |
| 20 | 80 | 20 | 50 |
| 25 | 75 | 40 | 55 |
| 35 | 65 | 94 | 68 |
| 50 | 50 | 110+ | 92 |
| 55 | 45 | 110+ | 103 |
| 100 | 0 | 110+ | 81 |

As indicated hereinbefore the additive employed in accordance with my invention is of particular importance in remaking a poor grade of petroleum asphalt so that it can be used as a substitute for high grade asphalts. Table 4, following, shows the use of the additive in the preparation of Medium Curing-3 cut back blend asphalts. In the column headed "Specification" Kansas and American Association of State Highway Officials, specifications for MC-3 cut back asphalts are given. In column 4 appear the data on the poor grade asphalt before the addition of the resin. In column 3 the data of the asphalt blended with the resin modifier of this invention appear. The asphalt in column 3 comprises a blend of 70 per cent of the 5.8 bottoms (Table 2) and 30 per cent of the resinous material prepared in accordance with Example 1 cut back with 22 per cent of a fuel oil, a No. 1 heating distillate. The asphalt in column 4 comprises a blend of 75 per cent of the 5.8 bottoms petroleum asphalt (Table 2) and 25 per cent of a fuel oil, No. 1 heating distillate.

Table 4.—MC-3 blends with and without resinous material

| Tests | Specifications | | With Resinous Material [1] | Without Resinous Material [2] |
|---|---|---|---|---|
| | AASHO | Kansas | | |
| SFV/140° F., Sec | 250–500 | 275–400 | 342 | 500 |
| Distillation: Percent by Vol. Total Dist. to 680° F. | | | | |
| to 437° F | 5 max | 5 max | 0.0 | 0.0 |
| to 500° F | 5–40 | 5–40 | 9.4 | 17.5 |
| to 600° F | 55–85 | 60–85 | 71.9 | 72.9 |
| Penetration of Dist. Residue | 120–300 | 200–300 | 285 | 218 |
| Ductility at 77° F., cm | 100+ | 100+ | 130 | 50 |
| Sol. CCl$_4$, percent | 99.5 | 99.5 | 99.9 | |
| Sol. CS$_2$ | | | 99.9 | |
| Oliensis Spot Test | Neg | Pos./Neg | Neg | Neg. |

[1] MC-3 Blend #1—Base of 70% 5.8% bottoms and 30% resinous material cut with 22% H. D. #1.
[2] MC-3 Blend #2—75% 5.8% bottoms, 25% H. D. #1.

The advantages of my invention are clearly apparent from the above tables and examples. In Table 3b the resinous material had a penetration value of 81 while the asphalt had a penetration value of 33. However a 50–50 blend by weight of each had a penetration value of 92. A blend comprising 55 per cent of the resinous material by weight and 45 per cent of the petroleum asphalt had a penetration value of 103. Thus the additive of my invention confers definite synergistic properties on asphalts as shown in Example 2. Synergism is also sometimes apparent in the ductility value.

Referring now to Table 4 a low grade petroleum asphalt is shown which does not meet Kansas or AASHO specifications. However by the practice of this invention an asphalt was prepared which was within the prescribed requirements. By the addition of 30 per cent of the resinous material having a penetration value of 50 to the asphalt having a penetration value of 218 an asphalt resulted having a penetration value of 285. The ductility value on the other hand was raised from 50 to 130 by the addition of my additive. The utility of my invention in the improvement of asphalts is readily seen. Asphalts or cut back asphalts produced in accordance with this invention are superior to average straight run asphalts particularly in ductility, penetration, and anti-strip values. However the present invention in its broader aspects is not limited to a particular asphalt having all of these advantages, but embraces various of the less advantages resulting from the addition of the resinous product. Modifications and variations are therefore not to be imposed as limitations but are within the spirit of my invention.

I claim:

1. A method for improving a low grade asphalt which comprises distilling a cracked residum to a pitch having a ring and ball softening point in excess of 170, separating from the distilled pitch a resin having a ductility at 77° F. in excess of 100 centimeters, a melting point of from 90° F. to 170° F., and a specific gravity of from 1.00 to 1.50, incorporating at least 0.25 per cent of said resin in an amount sufficient to improve the anti-stripping characteristics thereof into an asphalt having a ductility of at least 3.7 at 77° F. and a penetration at 77° F., 100 grams, 5 seconds, of at least 33.

2. A method in accordance with claim 1 in which the separation of the resin from the pitch is made by vacuum flashing.

3. A method in accordance with claim 1 in which the resin is separated from the pitch by solvent extraction.

4. A method of claim 1 in which the resin is separated from the pitch by vacuum flashing at 760° F. and 98 microns' mercury pressure.

5. A method for improving a low grade asphalt which comprises distilling a cracked residuum to a pitch having a ring and ball softening point in excess of 170, separating from the distilled pitch a resin having a ductility at 77° F. in excess of 100 centimeters, a melting point of from 90° F. to 170° F. and a specific gravity of from 1.00 to 1.50, incorporating from 5 to 55 per cent by weight of said resin based on the asphalt hereafter specified into an asphalt having a ductility of at least 3.7 at 77° F. and a penetration at 77° F., 100 grams, 5 seconds, of at least 33.

6. A method of improving the characteristics of a low grade asphalt which comprises distilling cracked residuum to form a pitch having a ring and ball softening point in excess of 170, separating said pitch into a resin having a specific gravity of from 1.00 to 1.50, a melting point of from 90° F. to 170° F., and a ductility at 77° F. in excess of 100 centimeters, and a residuum having substantially zero penetration and ductility, and incorporating from 5 per cent to 25 per cent of said resin based on the asphalt into an asphalt having a penetration at 77° F., 100 grams, 5 seconds, of at least 33 and a ductility at 77° F. of at least 3.7.

7. An improved asphalt composition comprising an asphalt having a penetration at 77° F., 100 grams, 5 seconds, of at least 33 and a ductility at 77° F. of at least 3.7, and a resin incorporated in said asphalt in an amount of at least 0.25 per cent by weight based on the asphalt, said resin having a specific gravity of from 1.00 to 1.50, a melting point of from 90° F. to 170° F., and a ductility at 77° F. in excess of 100 centimeters, said resin being prepared by the separation thereof from a pitch having a ring and ball softening point in excess of 170 produced by distillation of a cracked residuum.

References Cited in the file of this patent

UNITED STATES PATENTS

| Number | Name | Date |
| --- | --- | --- |
| 1,987,085 | Thurston | Jan. 8, 1935 |
| 2,018,771 | Wise | Oct. 29, 1935 |
| 2,024,096 | Dengler et al. | Dec. 10, 1935 |
| 2,029,288 | Bray | Feb. 4, 1936 |
| 2,278,671 | Roediger | Apr. 7, 1942 |